(12) United States Patent
Chen

(10) Patent No.: US 9,657,888 B2
(45) Date of Patent: May 23, 2017

(54) PORTABLE SELF-TIMER RACK

(71) Applicant: SHENZHEN KJSTAR COMPUTER CO., LTD, Shenzhen, Guangdong (CN)

(72) Inventor: Caiming Chen, Guangdong (CN)

(73) Assignee: SHENZHEN KJSTAR COMPUTER CO., LTD, Shenzhen, Guangdong (CN)

( * ) Notice: Subject to any disclaimer, the term of this patent is extended or adjusted under 35 U.S.C. 154(b) by 0 days.

(21) Appl. No.: 14/421,264

(22) PCT Filed: Jun. 18, 2014

(86) PCT No.: PCT/CN2014/080173
§ 371 (c)(1),
(2) Date: Feb. 12, 2015

(87) PCT Pub. No.: WO2015/039469
PCT Pub. Date: Mar. 26, 2015

(65) Prior Publication Data
US 2017/0114945 A1    Apr. 27, 2017

(51) Int. Cl.
*B66F 19/00* (2006.01)
*F16M 11/26* (2006.01)
*F16M 11/20* (2006.01)

(52) U.S. Cl.
CPC ......... *F16M 11/26* (2013.01); *F16M 11/2078* (2013.01)

(58) Field of Classification Search
CPC .... H04N 5/2251; H04N 5/2252; H04N 5/232; H04M 1/0252; H04M 1/0249; H04M 1/04; F16M 11/26; F16M 11/28; F16M 13/04; F16M 11/14; F16M 13/00; G03B 17/561; G03B 17/56; B25J 1/04; A01K 97/14; D06F 5/00; H02G 1/02
See application file for complete search history.

(56) References Cited

U.S. PATENT DOCUMENTS

| | | | |
|---|---|---|---|
| 9,049,358 B2 * | 6/2015 | Miller | H04N 5/2251 |
| 9,473,606 B1 * | 10/2016 | Sumida | H04M 1/04 |
| 2010/0202769 A1 * | 8/2010 | Polster | G03B 17/38 396/420 |
| 2014/0037281 A1 * | 2/2014 | Carney | G03B 17/561 396/421 |
| 2014/0209777 A1 * | 7/2014 | Klemin | F16M 13/04 248/544 |

* cited by examiner

*Primary Examiner* — Stephen Vu
(74) *Attorney, Agent, or Firm* — Jackson IPG PLLC; Demian K. Jackson

(57) ABSTRACT

A portable self-timer rack comprises a telescoping mechanism and a magnetic adsorption portion connected with the telescoping mechanism in a rotary manner. The magnetic adsorption portion comprises a box body and a magnet arranged in the box body, and the telescoping mechanism is connected with the box body through a rotary joint in a rotary manner and a wireless communication module is arranged in the telescoping mechanism.

9 Claims, 4 Drawing Sheets

PORTABLE SELF-TIMER RACK

FIELD OF THE INVENTION

The present invention relates to a self-timer rack, and in particular, to a portable self-timer rack.

BACKGROUND OF THE INVENTION

At present, shooting is affected due to the lack of the support of a rack when using such mobile devices as mobile phones, tablet computers and the like as self-timers.

SUMMARY OF THE INVENTION

In order to solve the problems in the prior art, the present invention provides a portable self-timer rack for supporting such mobile devices as mobile phones, tablet computers and the like as self-timers.

The present invention provides a portable self-timer rack, comprising a telescoping mechanism and a magnetic adsorption portion connected with the telescoping mechanism in a rotary manner. The magnetic adsorption portion comprises a box body and a magnet arranged in the box body. The telescoping mechanism is connected with the box body through a rotary joint in a rotary manner and a wireless communication module is arranged in the telescoping mechanism.

As a further improvement of the present invention, the box body comprises a face shell, a bottom shell and a locking shell. The face shell is connected with the bottom shell in a cohesion manner. An accommodating cavity is arranged between the face shell and the bottom shell. The magnet is arranged in the accommodating cavity between the face shell and the bottom shell. The back face of the bottom shell is provided with a spherical clamping slot. One end of the rotary joint is provided with a spherical body and the other end of the rotary joint is provided with a connecting rod. The spherical body is arranged in the spherical clamping slot. The exterior of the spherical clamping slot is in threaded connection with the locking shell.

As a further improvement of the present invention, the spherical body of the rotary joint is arranged in the accommodating cavity between the face shell and the bottom shell. The connecting rod of the rotary joint penetrates through the spherical clamping slot and the locking shell so as to be connected with the telescoping mechanism.

As a further improvement of the present invention, an iron box is arranged in the accommodating cavity between the face shell and the bottom shell, and the magnet is arranged in the iron box.

A multipole magnetism is produced by the iron box.

As a further improvement of the present invention, a rubber gasket is clipped between the spherical body of the rotary joint and the iron box.

As a further improvement of the present invention, a groove matched with the spherical body is arranged on the rubber gasket.

As a further improvement of the present invention, a silicon rubber case is sheathed outside the telescoping mechanism.

As a further improvement of the present invention, the telescoping mechanism at least comprises two sections of telescopic pipes.

As a further improvement of the present invention, the telescoping mechanism comprises nine sections of telescopic pipes.

As a further improvement of the present invention, the magnet is absorbed with an iron sheet.

As a further improvement of the present invention, the iron sheet is stainless iron sheet.

As a further improvement of the present invention, the optimal specification of the stainless iron sheet is 25*25 mm with a plus-minus tolerance of 5 mm, and the optimal thickness is 0.4 mm with a plus-minus tolerance of 0.2 mm.

Through the technical scheme above, the portable self-timer rack has the beneficial effects of: being capable of absorbing such mobile devices as mobile phones, tablet computers and the like through the magnet, shooting at any angle through the rotary joint, shooting under elongation regulation and being contracted for convenient carrying at the same time through the telescoping mechanism, and performing wireless communication with such mobile devices as mobile phones, tablet computers and the like through the wireless communication module so as to control shooting switches of such mobile devices as mobile phones, tablet computers and the like for facilitating operation.

DETAILED DESCRIPTION OF THE PREFERRED EMBODIMENTS

The present invention will be further described hereunder by reference to the drawings and embodiments of the present invention.

Figure 1:
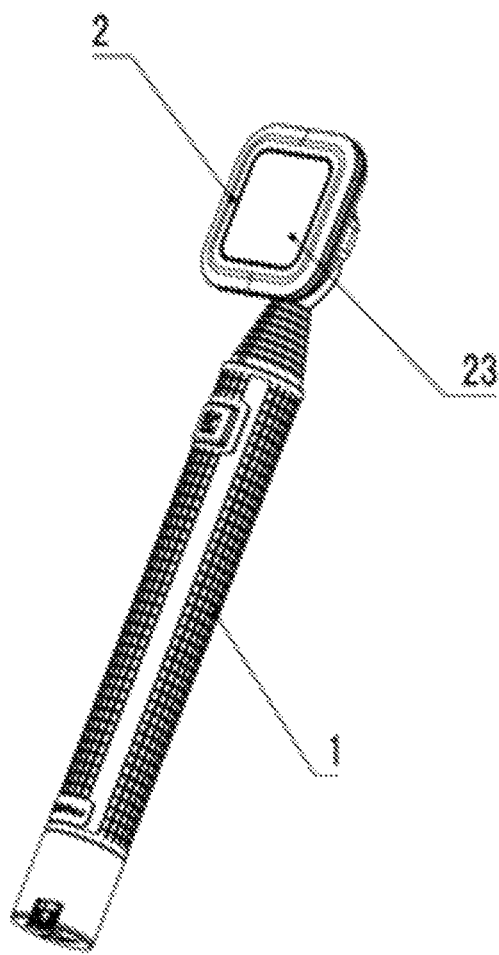
FIG. 1 is a schematic structural diagram of a portable self-timer rack of the present invention.
Figure 2:
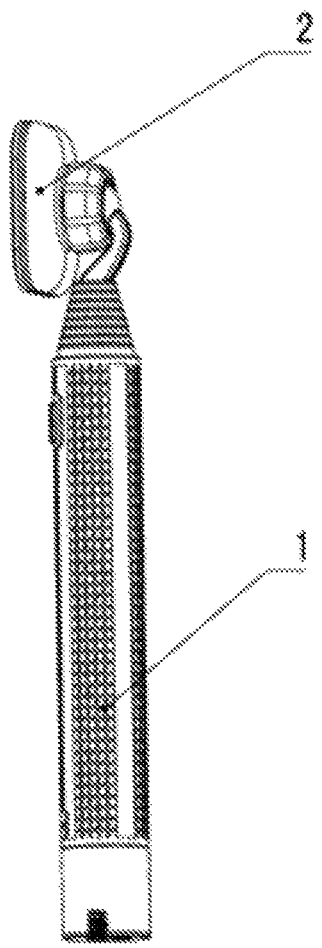
FIG. 2 is a schematic structural diagram of a portable self-timer rack of the present invention at another angle of view.
Figure 3:
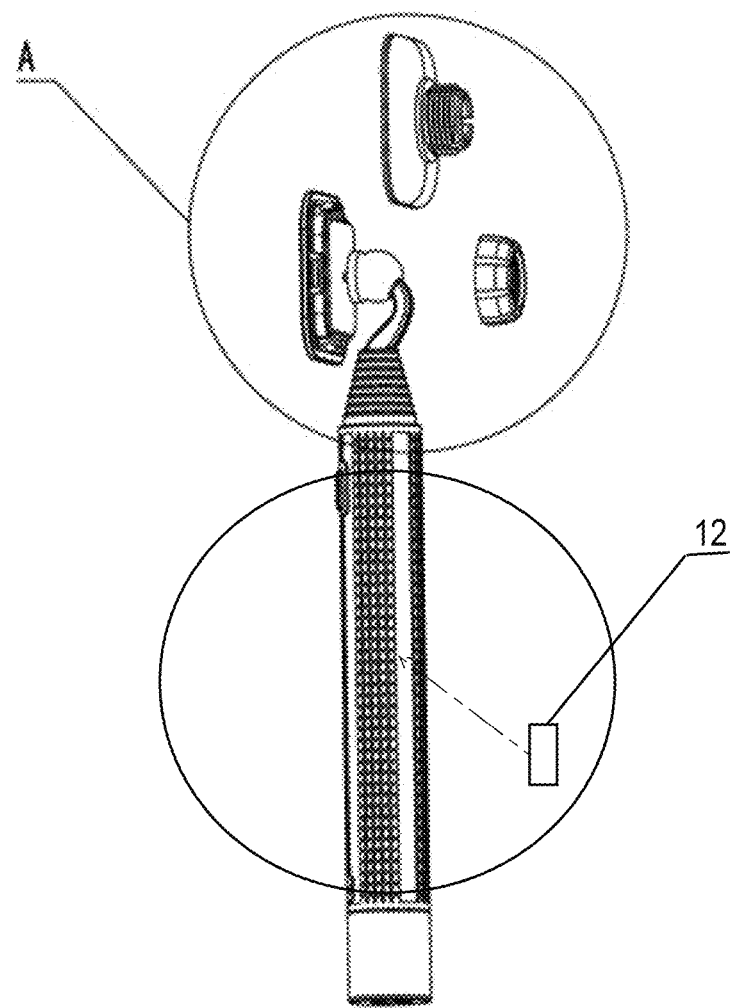
FIG. 3 is a schematic structural diagram of a disassembled portable self-timer rack.
Figure 4:
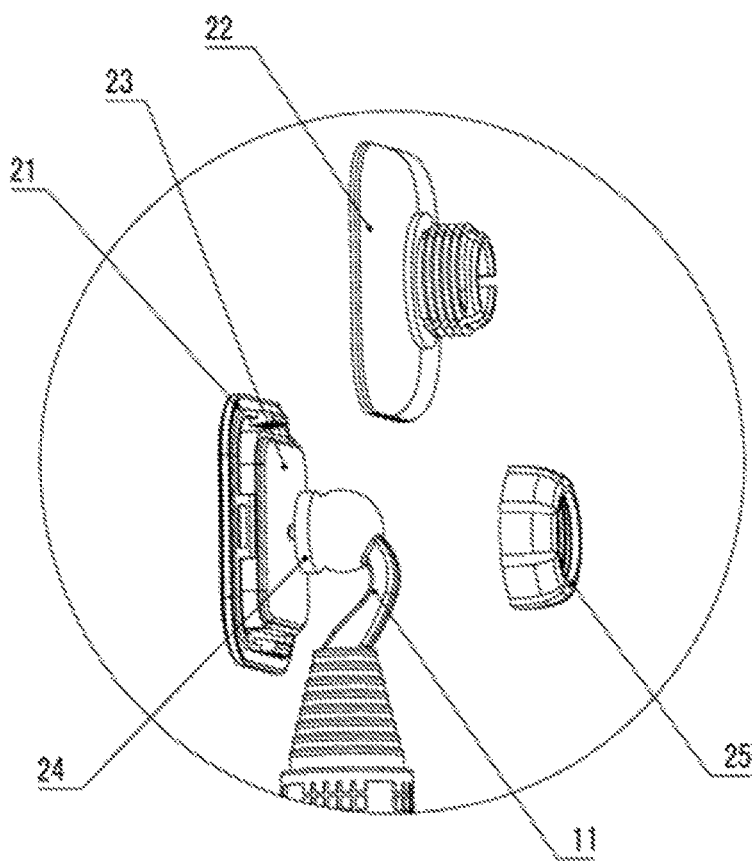
FIG. 4 is a partial enlarged diagram A of FIG. 3.

The drawing tags in FIGS. 1-4 are as follows: 1 refers to telescoping mechanism; 11 refers to rotary joint; 2 refers to magnetic adsorption portion; 21 refers to face shell; 22 refers to bottom shell; 23 refers to iron box; 24 refers to rubber gasket; and 25 refers to locking shell.

As shown in FIGS. 1-4, a portable self-timer rack comprises a telescoping mechanism 1 and a magnetic adsorption portion 2 connected with the telescoping mechanism 1 in a rotary manner. The magnetic adsorption portion 2 comprises a box body and a magnet arranged in the box body. The telescoping mechanism 1 is connected with the box body through a rotary joint 11 in a rotary manner and is provided with a wireless communication module 12 inside. A Bluetooth wireless communication module is preferably selected as the wireless communication module 12.

As shown in FIGS. 1-4, the box body comprises a face shell 21, a bottom shell 22 and a locking shell 25. The face shell 21 is connected with the bottom shell 22 in a cohesion manner. An accommodating cavity is arranged between the face shell 21 and the bottom shell 22. The magnet is arranged in the accommodating cavity between the face shell 21 and the bottom shell 22. The back face of the bottom shell 22 is provided with a spherical clamping slot. One end of the rotary joint 11 is provided with a spherical body and the other end of the rotary joint 11 is provided with a connecting rod. The spherical body is arranged in the spherical clamping slot. The exterior of the spherical clamping slot is in threaded connection with the locking shell 25. The side wall of the spherical clamping slot is provided with a cracked gap. The spherical boy of the rotary joint 11 may be clamped and contracted by the spherical clamping slot when screwing up the locking shell 25.

As shown in FIGS. 1-4, the spherical body of the rotary joint 11 is arranged in the accommodating cavity between the face shell 21 and the bottom shell 22. The connecting rod of the rotary joint 11 penetrates through the spherical clamping slot and the locking shell 25 to so as to be connected with the telescoping mechanism 1.

As shown in FIGS. 1-4, an iron box 23 is arranged in the accommodating cavity between the face shell 21 and the bottom shell 22, and the magnet is arranged in the iron box 23.

As shown in FIGS. 1-4, a rubber gasket 24 is clipped between the spherical body of the rotary joint 11 and the iron box 23.

As shown in FIGS. 1-4, a groove matched with the spherical body is arranged on the rubber gasket 24.

As shown in FIGS. 1-4, the telescoping mechanism 1 is sheathed with a silicon rubber case, and the silicon rubber case is provided with protruded strips.

As shown in FIGS. 1-4, the telescoping mechanism 1 at least comprises two sections of telescopic pipes.

As shown in FIGS. 1-4, the telescoping mechanism 1 preferably comprises nine sections of telescopic pipes, each of which is provided with a positioning groove. And the diameter of each section of pipe is 8 mm, 9 mm, 10 mm, 11 mm, 12 mm, 13 mm, 14 mm, 15 mm and 16 mm.

As shown in FIGS. 1-4, the magnet is absorbed with an iron sheet.

The portable self-timer rack provided by the present invention is capable of absorbing such mobile devices as mobile phones, tablet computers and the like through the magnet, shooting at any angle through the rotary joint, shooting under elongation regulation and being contracted for convenient carrying at the same time through the telescoping mechanism, and performing wireless communication with such mobile devices as mobile phones, tablet computers and the like through the wireless communication module so as to control shooting switches of such mobile devices as mobile phones, tablet computers and the like for facilitating operation. The portable self-timer rack provided by the present invention has the advantages that:

1. The rubber gasket 24 is arranged in the magnetic absorption portion 2, thus realizing rotation and shooting at any angle.

2. Nine sections of telescopic pipes can be contracted about 20 CM and elongated about 70 CM, which is convenient to take along while contracting and shoot while elongating.

3. The iron box is made of stainless steel and the iron sheet is made of stainless iron.

4. The box body can be subject to zinc alloy die casting and the circular box body can rotate.

5. The handle is provided with a silicon rubber case and the silicon rubber case is provided with protruded strips with label for shooting, thus facilitating to holding, and an elastic key is arranged below.

6. A Bluetooth wireless communication module is adopted so as to be convenient for wireless connection.

7. The portable self-timer rack is absorbed with the iron sheet through 4-poles to 8-poles magnet so that they are firmer and can be separated.

8. The portable self-timer rack is connected with the mobile phone and camera through Bluetooth, which is convenient to operate.

Above is further detailed description of the present invention by reference to the specific preferred embodiments, but the specific implementation of the present invention cannot be deemed to be merely limited by these descriptions. Those having ordinary skills in the art may further make a plurality of simple extrapolations or replacements without breaking away from the concept of the present invention, which shall all pertain to the protection scope of the present invention.

What is claimed is:

1. A portable self-timer rack, comprising a telescoping mechanism and a magnetic adsorption portion connected with the telescoping mechanism in a rotary manner, wherein the magnetic adsorption portion comprises a box body and a magnet arranged in the box body; the telescoping mechanism is connected with the box body through a rotary joint in a rotary manner and a wireless communication module is arranged in the telescoping mechanism.

2. The portable self-timer rack according to claim 1, wherein the spherical body of the rotary joint is arranged in the accommodating cavity between the face shell and the bottom shell; and the connecting rod of the rotary joint penetrates through the spherical clamping slot and the locking shell to connect with the telescoping mechanism.

3. The portable self-timer rack according to claim 1, wherein an iron box is arranged in the accommodating cavity between the face shell and the bottom shell, and the magnet is arranged in the iron box.

4. The portable self-timer rack according to claim 3, wherein a rubber gasket is clipped between the spherical body of the rotary joint and the iron box.

5. The portable self-timer rack according to claim 4, wherein a groove matched with the spherical body is arranged on the rubber gasket.

6. The portable self-timer rack according to claim 1, wherein a silicon rubber case is sheathed outside the telescoping mechanism.

7. The portable self-timer rack according to claim 1, wherein the telescoping mechanism at least comprises two sections of telescopic pipes.

8. The portable self-timer rack according to claim 1, wherein the telescoping mechanism comprises nine sections of telescopic pipes.

9. The portable self-timer rack according to claim 1, wherein the magnet is absorbed with an iron sheet.

* * * * *